United States Patent [19]

Schmitt

[11] Patent Number: 5,418,534
[45] Date of Patent: May 23, 1995

[54] METHOD OF COMPENSATING FOR A SIGNAL COMPONENT GENERATED BY A MOVING RADAR ANTENNA

[75] Inventor: Peter Schmitt, Bellenberg, Germany

[73] Assignee: Deutsche Aerospace AG, Munich, Germany

[21] Appl. No.: 116,604

[22] Filed: Sep. 7, 1993

[30] Foreign Application Priority Data

Sep. 8, 1992 [DE] Germany ............ 42 29 951.9

[51] Int. Cl.$^6$ .................................. G01S 13/534
[52] U.S. Cl. ...................... 342/159; 342/161; 342/194
[58] Field of Search ............ 342/159, 160, 161, 162, 342/194

[56] References Cited

U.S. PATENT DOCUMENTS

| | | |
|---|---|---|
| 3,737,900 | 6/1973 | Vehrs . |
| 3,877,011 | 4/1975 | Holberg et al. .............. 342/161 |
| 3,952,302 | 4/1976 | Mullins . |
| 4,104,631 | 8/1978 | Weigle et al. . |
| 4,249,179 | 2/1981 | Kolacny . |
| 4,394,658 | 7/1983 | Short, III ................ 342/160 X |
| 4,586,044 | 4/1986 | Hopwood et al. . |
| 4,728,953 | 3/1988 | Richmond . |

FOREIGN PATENT DOCUMENTS

3841864A1  6/1990  European Pat. Off. .
2738832   11/1978  Germany .

*Primary Examiner*—Gilberto Barrón, Jr.
*Attorney, Agent, or Firm*—Spencer, Frank & Schneider

[57] ABSTRACT

The present invention relates to a method and apparatus for producing compensated baseband signal components for a moving radar antenna. A fixed frequency oscillator is used and a baseband signal is complex multiplied by a time dependent multiplicand to produce a signal free of overlap convolution so that clutter signal components are centered around the Doppler frequency $f_D=0$. Consequently, target detection is as easy as for a stationary radar antenna.

20 Claims, 3 Drawing Sheets

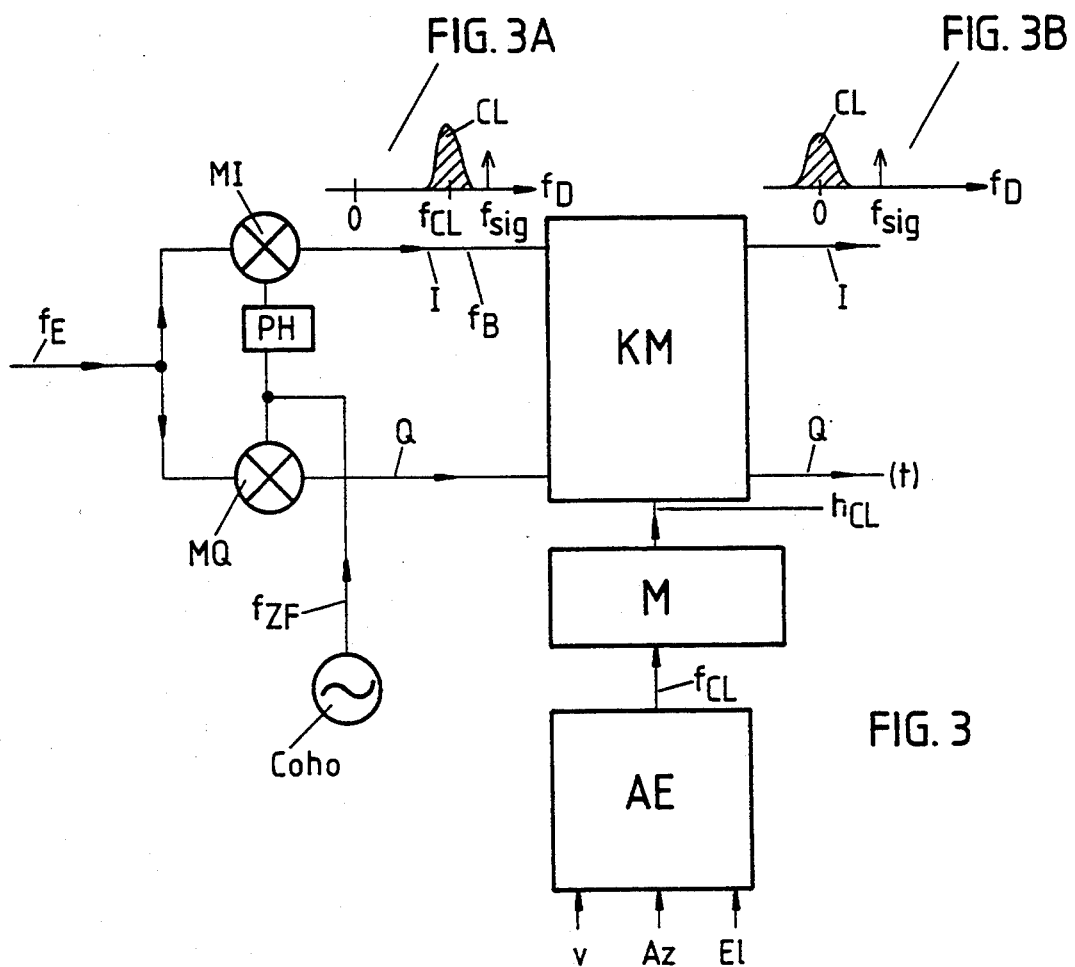

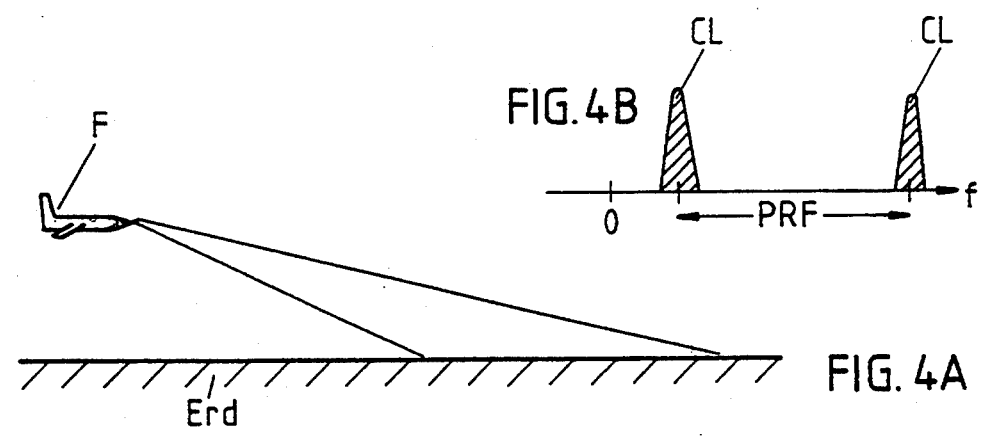
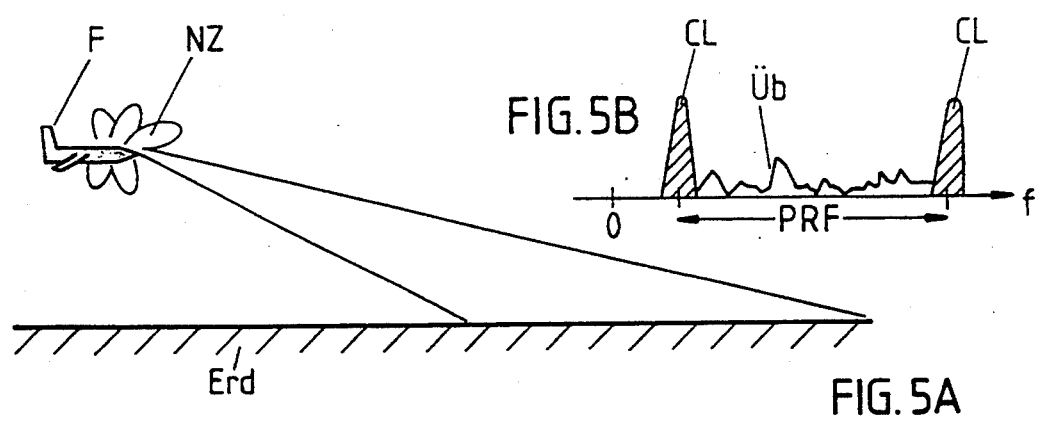
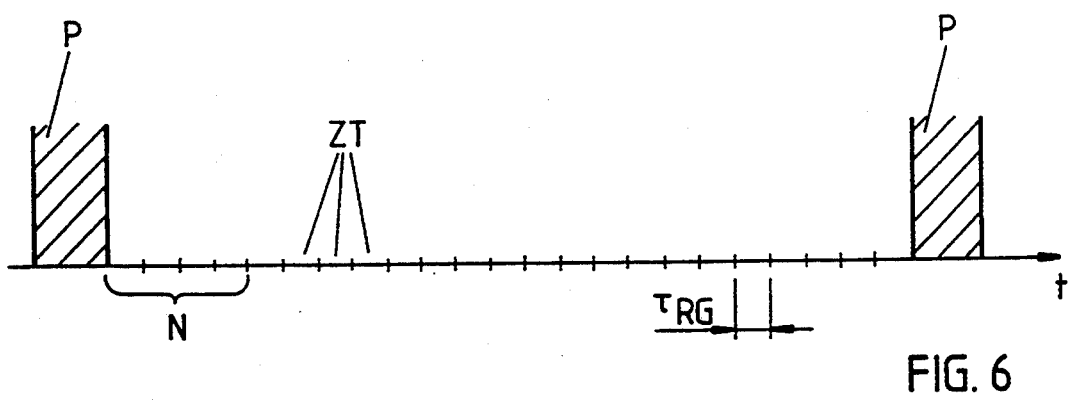

METHOD OF COMPENSATING FOR A SIGNAL COMPONENT GENERATED BY A MOVING RADAR ANTENNA

BACKGROUND OF THE INVENTION

1. Field of the Invention

The present invention relates to a method and apparatus for producing compensated baseband signal components generated by a moving radar antenna.

2. Description of Related Art

In a radar system, the signal received by the radar antenna is converted into a baseband signal and evaluated as a function of the Doppler frequency $f_D$.

FIG. 1A illustrates a representative frequency spectrum for a non-moving (stationary) radar antenna as a function of the Doppler frequency $f_D$ (abscissa). The signal components originating from stationary targets, also called (fixed target) clutter CL, are located at the Doppler frequency $f_D=0$. Signal components originating from targets Z1 and Z2, each moving at different velocities, are located at Doppler frequencies $f_{21}$ and $f_{22}$ respectively.

If a radar antenna is positioned on a moving carrier, for example, an aircraft, the representative frequency spectrum shown in FIG. 1B is produced which is a function of the velocity of the carrier. This spectrum differs from the spectrum of FIG. 1A by a shift of the frequency component $f_{CL}$ (clutter frequency) and target Doppler frequencies $f_{21}$ and $f_{22}$ as a function of the velocity of the moving carrier.

For evaluation of a spectrum such as that in FIG. 1B, it is advisable to initially shift the spectrum so that clutter frequency $f_{CL}$ is again positioned at the Doppler frequency $f_D=0$ (FIG. 1C).

Such a frequency shift is possible with a conventional circuit arrangement shown in FIG. 2. The signal received by the moving radar antenna contains a frequency component $f_E = f_{ZF} + f_{sig} + f_{CL}$ in the intermediate frequency (IF) range, where $f_{ZF}$ is the intermediate frequency, $f_{sig}$ is the frequency component originating from moving targets (the signal component to be evaluated) and $f_{CL}$ is the clutter frequency. Such an input spectrum is shown schematically in FIG. 2A for a moving target. With the aid of a quadrature demodulator, a signal is converted into a baseband signal containing signal components I and Q. The quadrature demodulator includes mixers MI and MQ and a detunable frequency oscillator Coho, also called a coherent oscillator. The oscillator signal generated by oscillator Coho is applied directly to mixer MQ. Mixer MI has a phase shifter PH connected to its input to shift the oscillator signal in phase by $\pi/2$ (90°). Oscillator Coho is detuned by an adjustment value signal ST corresponding to clutter frequency $f_{CL}$ and determined in an evaluation unit AE. Evaluation unit AE considers translatory velocity v of the carrier (and antenna), and azimuth setting Az and elevation setting El of the radar antenna with respect to the bearing of the carrier, according to the following formula:

$$f_{CL} \approx 2v/\lambda \cdot \cos Az \cdot \cos El$$

where, $\lambda$ is the wavelength of the transmitted radar signal.

Detuning of oscillator Coho must always be changed corresponding to angles Az and El, which are determined, for example, by angle sensors of the antenna, and velocity v, so clutter frequency $f_{CL}$ can be estimated. A measurement of $f_{CL}$ in a signal processor is also possible. Accordingly, oscillator Coho is then detuned by an adjustment voltage ST which is proportional to $f_{CL}$. This produces the representative spectrum at baseband shown in FIG. 2B.

Such a conventional method, which essentially operates with analog signals, and has the drawback that it is complicated and not cost-effective.

SUMMARY OF THE INVENTION

It is an object of the present invention to provide a method for producing compensated baseband signals for a moving antenna radar system which is cost-effective and reliable, and with greater compensation accuracy.

The above and other objects are accomplished according to the invention by the provision of an apparatus for producing compensated baseband signals in a radar system including an oscillator for producing a fixed oscillator signal, a quadrature demodulator coupled to the fixed oscillator signal for demodulating an intermediate frequency radar signal and producing first in-phase and quadrature baseband signals, and a complex multiplier coupled to the in-phase and quadrature baseband signals for producing the compensated in-phase and baseband signals by complex multiplying the first in-phase and quadrature baseband signals with a time dependent multiplicand $h_{CL}(t)$, where the time dependent multiplicand is based on a velocity, an azimuth and an elevation setting of an antenna of the radar system.

The present invention also provides a method for producing compensated baseband signals in a radar system including the steps of producing a fixed oscillator signal, demodulating an intermediate frequency radar signal based on the fixed oscillator signal to produce first in-phase and quadrature baseband signals, and producing compensated in-phase and baseband signals by complex multiplying the first in-phase and quadrature baseband signals with a time dependent multiplicand $h_{CL}(t)$, wherein the time dependent multiplicand is based on a velocity, an azimuth and an elevation setting of an antenna of the radar system.

Preferably, the time dependent multiplicand $h_{CL}(t)$ is based on $$h_{CL}(t) = Ae^{i \int_0^t f_{CL}(\tau)d\tau}$$

where, A is a predetermined constant, i is the square root of $-1$, $f_{CL}$ is a clutter signal frequency and t is a time duration of the integration. Further, the multiplicand $h_{CL}(t)$ is selected to shift a clutter signal frequency in the compensated baseband signals to be centered around a Doppler frequency signal $f_D=0$. The first baseband signals have a predetermined pulse repetition frequency which is divided into a plurality of time gates between each pulse, and the complex multiplier does not complex multiply the first baseband signals with the time dependent multiplicand $h_{CL}(t)$ for a predetermined number N of time gates after a pulse. The predetermined number N of time gates is preferably determined by $$N = \frac{h_{\mathit{eff}}}{150 \cdot \tau_{RG}}$$

where, $\tau_{RG}$ is a time duration of a time gate, and $h_{\mathit{eff}}$ is an effective flying altitude of an aircraft. Preferably, $h_{\mathit{eff}}$ is selected from an altitude range between one to three times the actual flying altitude of the aircraft.

A first advantage of the invention is that an oscillator provides a permanently fixed intermediate frequency $f_{ZF}$, considerably simplifying the oscillator circuitry because a conventional VCO (voltage controlled oscillator) circuit is no longer necessary. Moreover, a fixed frequency oscillator is frequency stable, particularly with respect to drift.

A second advantage is that corrections, or compensations, are made at a lower baseband frequency than that of a conventional system, permitting digital operating methods and techniques to be employed.

A third advantage is that the radar system can be calibrated by way of a program, or software. Consequently, conventional adjustment members, for example, high precision potentiometers, are substantially avoided.

Further advantages will be apparent based on the following description of an embodiment of the invention.

BRIEF DESCRIPTION OF THE DRAWINGS

FIG. 2A shows a representative frequency spectrum of an input signal to the conventional circuit arrangement of FIG. 2.

FIG. 2B shows a representative frequency spectrum of a baseband frequency signal produced by the conventional circuit arrangement of FIG. 2.

FIG. 3 shows a circuit arrangement for generating a frequency shift according to the present invention.

FIG. 3A shows a representative frequency spectrum of a baseband frequency signal produced by the circuit arrangement according to the present invention.

FIG. 3B shows a representative frequency spectrum of a compensated baseband signal produced by complex multiplication of the baseband signal of FIG. 3A according to the present invention.

FIG. 4A shows an aircraft F with a radar antenna, having a radiation pattern with no side lobes, oriented toward the ground.

FIG. 4B shows a representative frequency spectrum of an IF signal for the antenna of FIG. 4A having a pulse repetition frequency PRF.

FIG. 5A shows an aircraft F with a radar antenna, having a radiation pattern with side lobes, oriented toward the ground.

FIG. 5B shows a representative frequency spectrum of an IF signal for the antenna of FIG. 5A having a pulse repetition frequency PRF.

FIG. 6 depicts behavior of a radar system according to the present invention as a function of time.

DESCRIPTION OF THE PREFERRED EMBODIMENT

Figure 1A:
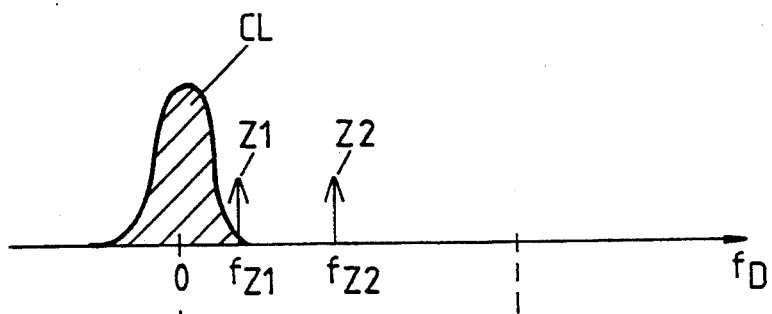
FIG. 1A shows a representative frequency spectrum for a stationary radar antenna as a function of Doppler frequency $f_D$.
Figure 1B:
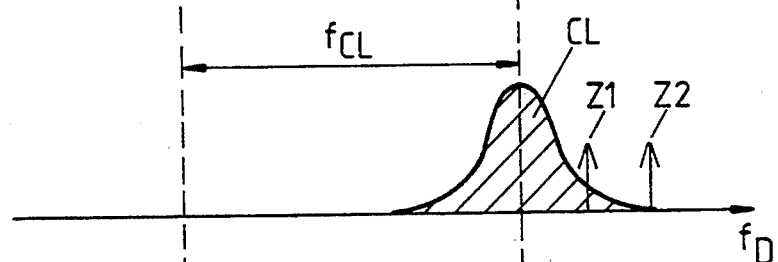
FIG. 1B shows a representative frequency spectrum for a moving radar antenna on a moving carrier as a function of the velocity of the carrier.
Figure 1C:
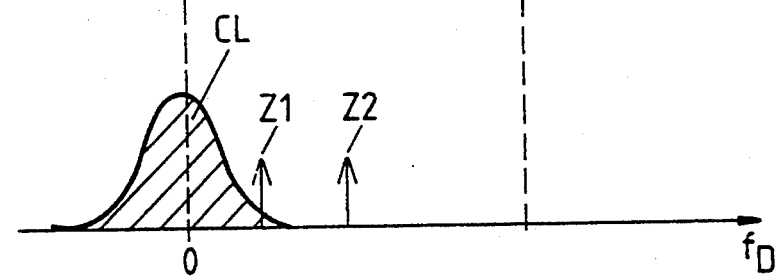
FIG. 1C shows a representative frequency spectrum for a moving radar antenna on a moving carrier which has been shifted to position clutter frequency signals at a Doppler frequency $f_D=0$.
Figure 2:
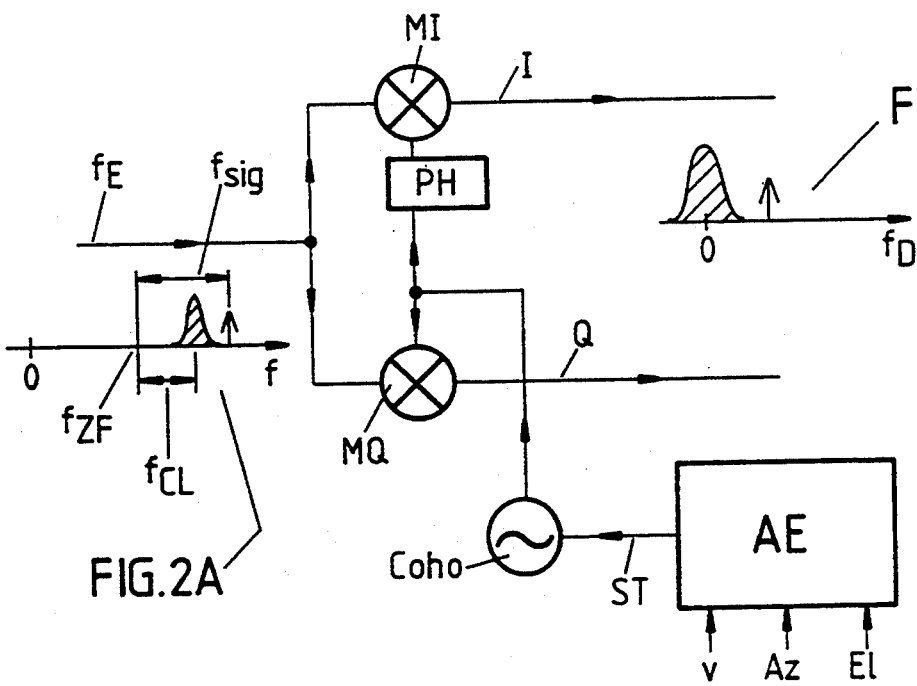
FIG. 2 shows a conventional circuit arrangement for generating a frequency shift of a frequency spectrum of a moving antenna on a moving carrier.

In the embodiment of the present invention shown in FIG. 3, the IF range differs from that of FIG. 2 in that the coherent oscillator Coho generates a permanently fixed intermediate frequency $f_{ZF}$. To better explain the invention, it is assumed that the signal present in the IF range has a frequency component $f_E$ corresponding to that shown in FIG. 2A. If such an exemplary IF signal is input to a quadrature demodulator formed by MI, MQ, PH and Coho, a baseband signal is output which includes the frequency component $f_B = f_{sig} + f_{CL}$ (FIG. 3A). The baseband signal covers, for example, a frequency range from $-50$ Hz to 50 KHz. This baseband signal, present in analog form, is then input to a complex multiplier KM. Complex multiplier KM initially digitizes the baseband signal using, for example, an analog/digital converter, and then the digitized signal is complex multiplied (convoluted) in digital form with a multiplicand $h_{CL}(t)$ in such a way that a digital output signal corresponding to the representative frequency spectrum of FIG. 3B appears as a complex signal at both outputs I, Q of the complex multiplier KM. This output signal contains the clutter signal component CL at the Doppler frequency $f_D=0$ and a target signal component at the Doppler frequency $f_{sig}$, produced by an exemplary target assumed to exist in this case.

Multiplicand $h_{CL}(t)$, which is a function of time, may be formed as follows. The clutter frequency $f_{CL}$ is initially determined in evaluation unit AE from the translatory velocity v of the radar antenna or its carrier, for example, an aircraft, and from the azimuth setting Az (azimuth angle) and the elevation setting El (elevation angle) of the radar antenna with respect to the bearing of the carrier. A signal corresponding to clutter frequency $f_{CL}$ is output from evaluation unit AE to circuit M, where time dependent multiplicand $h_{CL}(t)$ is formed according to the following formula:

$$h_{CL}(t) = A e^{j \int_0^t f_{CL}(\tau) d\tau}$$

where,
A is a constant which is determined, for example, empirically; and
t is the time duration of the integration.

A signal corresponding to a multiplicand $h_{CL}(t)$ is applied to complex multiplier KM where complex multiplication (convolution) of the baseband signal takes place.

This method is particularly reliable if overlap convolution of side lobe clutter from the side lobes of the radar antenna is avoided. In greater detail, FIG. 4A depicts an aircraft F equipped with a radar antenna oriented toward the direction of the ground Erd. In this case, the radar antenna is assumed to have an antenna radiation pattern with no side lobes, and no moving target is present on ground Erd. The frequency spectrum of the IF signal (FIG. 4B) includes only signal components which originate from (fixed target) clutter CL and repeats at pulse repetition frequency PRF (FIG. 4B). Any target signal components appearing between the repeating (fixed target) clutter components are easily detected.

If, however, the antenna radiation pattern includes several side lobes (FIG. 5B), the spectrum of the IF signal contains a considerable amount of signal components between the repeating (fixed target) clutter components caused by overlap convolution Üb (FIG. 5B). Thus, overlap convolution makes detection of a target more difficult than in the previous case. Overlap convolution can be avoided if a radar antenna is employed having a radiation pattern with the smallest possible side lobe component, at least in the observation direction of the main lobe. This can be substantially realized by the appropriate mechanical configuration of the radar antenna.

In addition, or as an alternative to an appropriate antenna configuration, it is particularly advantageous to select a signal evaluation process which is insensitive to signal components originating from overlap convolution. FIG. 6 depicts behavior of a pulse radar system as a function of time t. The pulse radar system sends out pulses P limited in time and transmitted periodically in time according to a selected PRF. The time between two pulses can be divided into a plurality of time gates ZT each having a time duration $\tau_{RG}$ for digitizing the baseband signal. Although not shown, 200 time gates ZT can be selected, for example, to exist between two pulses P. Since the side lobes affect only the short range of the system, it is advantageous to not include a selected number of time gates immediately following a transmitted pulse P when complex multiplying the signal during evaluation. Consequently, a baseband signal advantageously results after complex multiplication with $h_{CL}(t)$ as shown in FIG. 4B. The number N of time gates ZT selected having no signal during evaluation is based on the following formula:

$$N = \frac{h_{eff}}{150 \cdot \tau_{RG}[\mu sec]}$$

where $\tau_{RG}$ is the time duration of a time gate measured in $\mu$sec; and $h_{eff}$ is the effective flying altitude measured in meters.

The effective flying altitude $h_{eff}$ is selected from an altitude range between the actual flying altitude of the carrier and three times the actual flying altitude of the carrier. Selection of the effective flying altitude $h_{eff}$ is a function of the electrical and/or mechanical structure of the radar system and/or the radar antenna, and is selected, for example, so that the clutter CL in the baseband signal is centered as accurately as possible at the Doppler frequency $f_D=0$.

The method of the present invention can be advantageously used with radar systems operating with a "medium PRF" or a "low PRF" that is a PRF which lies, for example, in a range between about 1 KHz and 20 KHz.

The present invention is not limited to the described embodiments but can be applied in the same sense for other embodiments, for example, with other pulse radars that are positioned, for example, on a motor vehicle. Additional modifications and changes may be made to the disclosed embodiment of the present invention, however, the invention is not limited to the details set forth. Accordingly, modification may be made without departing from the spirit or scope of the concept of the present invention as defined by the appended claims and their equivalents.

What is claimed is:

1. An apparatus for producing compensated baseband signals in a radar system, comprising:
   an oscillator for producing a fixed oscillator signal;
   a quadrature demodulator coupled to the fixed oscillator signal for demodulating an intermediate frequency radar signal and producing first in-phase and quadrature baseband signals; and
   a complex multiplier coupled to the in-phase and quadrature baseband signals for producing compensated in-phase and quadrature baseband signals by complex multiplying the first in-phase and quadrature baseband signals with a time dependent multiplicand $h_{CL}(t)$ which is based on a velocity, an azimuth and an elevation setting of an antenna of the radar system, wherein $$h_{CL}(t) = Ae^{i\int_0^t f_{CL}(\tau)d\tau},$$

A is a predetermined constant, i is the square root of $-1$, $f_{CL}$ is a clutter signal frequency and t is a time duration of the integration.

2. The apparatus according to claim 1, wherein the multiplicand $h_{CL}$ is selected to shift a clutter signal frequency in the compensated baseband signals to be centered around a Doppler frequency signal $f_D=0$.

3. The apparatus according to claim 1, wherein the first baseband signals have a predetermined pulse repetition frequency which is divided into a plurality of time gates between each pulse, and the complex multiplier does not complex multiply the first baseband signals with the time dependent multiplicand $h_{CL}(t)$ for a predetermined number N of time gates after a pulse.

4. The apparatus according to claim 3, wherein the radar system is in an aircraft.

5. The apparatus according to claim 4, wherein the predetermined number N of time gates is determined by $$N = \frac{h_{eff}}{150 \cdot \tau_{RG}}$$

wherein, $\tau_{RG}$ is a time duration of a time gate, and $h_{eff}$ is an effective flying altitude of the aircraft.

6. The apparatus according to claim 5, wherein the effective flying altitude of the aircraft is selected from an altitude range between one to three times the actual flying altitude of the aircraft.

7. The apparatus according to claim 1, wherein the radar system operates with a medium or low pulse repetition frequency.

8. A method for producing compensated baseband signals in a radar system comprising the steps of:
   producing a fixed oscillator signal;
   demodulating an intermediate frequency radar signal to produce first in-phase and quadrature baseband signals; and
   producing compensated in-phase and quadrature baseband signals by complex multiplying the first in-phase and quadrature baseband signals with a time dependent multiplicand $h_{CL}(t)$ which is based on a velocity, an azimuth, and an elevation setting of an antenna of the radar system, wherein $$h_{CL}(t) = A e^i \int_0^t f_{CL}(\tau) d\tau,$$

A is a predetermined constant, i is the square root of $-1$, $f_{CL}$ is a clutter signal frequency and t is a time duration of the integration.

9. The method according to claim 8, further comprising the step of selecting the multiplicand $h_{CL}$ to shift a clutter signal frequency in the compensated baseband signals to be centered around a Doppler frequency signal $f_D=0$.

10. The method according to claim 8, wherein the first baseband signals have a predetermined pulse repetition frequency which is divided into a plurality of time gates between each pulse, the method further comprising the step of not complex multiplying the first baseband signals with the time dependent multiplicand $h_{CL}(t)$ for a predetermined number N of time gates after a pulse.

11. The method according to claim 10, wherein the radar system is located in an aircraft.

12. The method according to claim 11, further comprising the step of determining the predetermined number N of time gates by $$N = \frac{h_{\text{eff}}}{150 \cdot \tau_{RG}}$$

wherein, $\tau_{RG}$ is a time duration of a time gate, and $h_{\text{eff}}$ is an effective flying altitude of the aircraft.

13. The method according to claim 12, further comprising the step of selecting the effective flying altitude of the aircraft from an altitude range between one to three times the actual flying altitude of the aircraft.

14. The method according to claim 8, wherein the radar system operates with a medium or low pulse repetition frequency.

15. An apparatus for producing compensated baseband signals in a radar system in an aircraft, comprising:
   an oscillator for producing a fixed oscillator signal;
   a quadrature demodulator coupled to the fixed oscillator signal for demodulating an intermediate frequency radar signal and producing first in-phase and quadrature baseband signals, the first baseband signals having a predetermined pulse repetition frequency which is divided into a plurality of time gates between each pulse; and
   a complex multiplier coupled to the in-phase and quadrature baseband signals for producing compensated in-phase and quadrature baseband signals by complex multiplying the first in-phase and quadrature baseband signals with a time dependent multiplicand $h_{CL}(t)$ after a predetermined number N of time gates after a pulse, the time dependent multiplicand $h_{CL}(t)$ being based on a velocity, an azimuth and an elevation setting of an antenna of the radar system, and the predetermined number N of time gates being determined by $$N = \frac{h_{\text{eff}}}{150 \cdot \tau_{RG}}$$

wherein, $\tau_{RG}$ is a time duration of a time gate, and $h_{\text{eff}}$ is an effective flying altitude of the aircraft.

16. The apparatus according to claim 15, wherein the effective flying altitude of the aircraft is selected from an altitude range between one to three times the actual flying altitude of the aircraft.

17. The apparatus according to claim 15, wherein the radar system operates with a medium or low pulse repetition frequency.

18. A method for producing compensated baseband signals in a radar system in an aircraft comprising the steps of:
   producing a fixed oscillator signal;
   demodulating an intermediate frequency radar signal to produce first in-phase and quadrature baseband signals, the first baseband signals having a predetermined pulse repetition frequency which is divided into a plurality of time gates between each pulse;
   producing compensated in-phase and baseband signals by complex multiplying the first in-phase and quadrature baseband signals with a time dependent multiplicand $h_{CL}(t)$ after a predetermined number N of time gates after a pulse, the time dependent multiplicand $h_{CL}(t)$ being based on a velocity, an azimuth and an elevation setting of an antenna of the radar system; and
   determining the predetermined number N of time gates by $$N = \frac{h_{\text{eff}}}{150 \cdot \tau_{RG}}$$

wherein, $\tau_{RG}$ is a time duration of a time gate, and $h_{\text{eff}}$ is an effective flying altitude of the aircraft.

19. The method according to claim 18, further comprising the step of selecting the effective flying altitude of the aircraft from an altitude range between one to three times the actual flying altitude of the aircraft.

20. The method according to claim 18, wherein the radar system operates with a medium or low pulse repetition frequency.

* * * * *